(12) United States Patent
Simon et al.

(10) Patent No.: US 9,079,174 B2
(45) Date of Patent: Jul. 14, 2015

(54) CATALYST FOR USE IN HYDROCONVERSION, COMPRISING AT LEAST ONE ZEOLITE AND METALS FROM GROUPS VIII AND VIB, AND PREPARATION OF THE CATALYST

(71) Applicants: Total Raffinage Marketing, La Defense (FR); IFP Energies Nouvelles, Rueil-Malmaison Cedex (FR)

(72) Inventors: Laurent Simon, Villeurbanne (FR); Bertrand Guichard, Izeaux (FR); Gregory Lapisardi, Lyons (FR); Hugues Dulot, Lyons (FR); Valentina De Grandi, Schaerbeek (BE); Delphine Minoux, Nivelles (BE); Jean Pierre Dath, Beloeil (BE)

(73) Assignees: TOTAL RAFFINAGE MARKETING, La Defense (FR); IFP ENERGIES NOUVELLES, Rueil-Malmaison Cedex (FR)

( * ) Notice: Subject to any disclaimer, the term of this patent is extended or adjusted under 35 U.S.C. 154(b) by 291 days.

(21) Appl. No.: 13/723,616

(22) Filed: Dec. 21, 2012

(65) Prior Publication Data
US 2013/0180886 A1 Jul. 18, 2013

(30) Foreign Application Priority Data
Dec. 22, 2011 (FR) .................................... 11 04025

(51) Int. Cl.
*C10G 47/02* (2006.01)
*C10G 47/18* (2006.01)
*C10G 47/20* (2006.01)
*B01J 31/04* (2006.01)
(Continued)

(52) U.S. Cl.
CPC ................ *B01J 31/34* (2013.01); *B01J 29/064* (2013.01); *B01J 29/076* (2013.01); *B01J 29/166* (2013.01);
(Continued)

(58) Field of Classification Search
CPC ........ B01J 27/188; B01J 27/19; B01J 29/064; B01J 29/076; B01J 29/166; B01J 29/7815; B01J 31/0209; B01J 31/04; B01J 31/34; B01J 35/002; B01J 37/0009; B01J 37/0203; B01J 37/0205; B01J 37/20; B01J 37/26; B01J 37/28; C10G 47/20
See application file for complete search history.

(56) References Cited

U.S. PATENT DOCUMENTS

2006/0054536 A1 3/2006 Fujikawa et al.
2008/0194892 A1 8/2008 Cholley et al.
(Continued)

FOREIGN PATENT DOCUMENTS

EP 1 577 007 A1 9/2005
EP 1 900 430 A1 3/2008
(Continued)

OTHER PUBLICATIONS
Search Report of FR 1104025 (Jul. 12, 2012).

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

The invention concerns a catalyst containing a support comprising at least one binder and at least one zeolite having at least one series of channels the opening of which is defined by a ring containing 12 oxygen atoms, said catalyst comprising phosphorus, at least one C1-C4 dialkyl succinate, acetic acid and a hydrodehydrogenating function comprising at least one element from group VI B and at least one element from group VIII, the Raman spectrum of the catalyst comprising bands at 990 and/or 974 cm-1, characteristic of at least one Keggin heteropolyanion, the characteristic bands of said succinate and the characteristic principal band of acetic acid at 896 cm-1. The invention also concerns the process for preparing the catalyst and its use in hydroconversion.

18 Claims, 1 Drawing Sheet

(51) Int. Cl.

| | | |
|---|---|---|
| *B01J 37/00* | (2006.01) | |
| *B01J 29/076* | (2006.01) | |
| *B01J 31/34* | (2006.01) | |
| *B01J 37/20* | (2006.01) | |
| *B01J 37/26* | (2006.01) | |
| *B01J 37/28* | (2006.01) | |
| *B01J 37/02* | (2006.01) | |
| *B01J 29/16* | (2006.01) | |
| *B01J 29/78* | (2006.01) | |
| *B01J 29/064* | (2006.01) | |
| *B01J 31/02* | (2006.01) | |
| *B01J 35/00* | (2006.01) | |
| B01J 27/188 | (2006.01) | |
| B01J 27/19 | (2006.01) | |

(52) U.S. Cl.
CPC .......... *B01J 29/7815* (2013.01); *B01J 31/0209* (2013.01); *B01J 31/04* (2013.01); *B01J 35/002* (2013.01); *B01J 37/0009* (2013.01); *B01J 37/0203* (2013.01); *B01J 37/0205* (2013.01); *B01J 37/20* (2013.01); *B01J 37/26* (2013.01); *B01J 37/28* (2013.01); *C10G 47/20* (2013.01); *B01J 27/188* (2013.01); *B01J 27/19* (2013.01); *B01J 2229/42* (2013.01)

(56) References Cited

U.S. PATENT DOCUMENTS

| | | |
|---|---|---|
| 2009/0071875 A1 | 3/2009 | Kato et al. |
| 2010/0032341 A1 | 2/2010 | Mao et al. |
| 2011/0230691 A1 | 9/2011 | Bonduelle et al. |

FOREIGN PATENT DOCUMENTS

| | | |
|---|---|---|
| EP | 2 072 127 A1 | 6/2009 |
| WO | WO 2006/077326 A1 | 7/2006 |
| WO | WO 2010/020714 A1 | 2/2010 |
| WO | WO 2011/080407 A1 | 7/2011 |

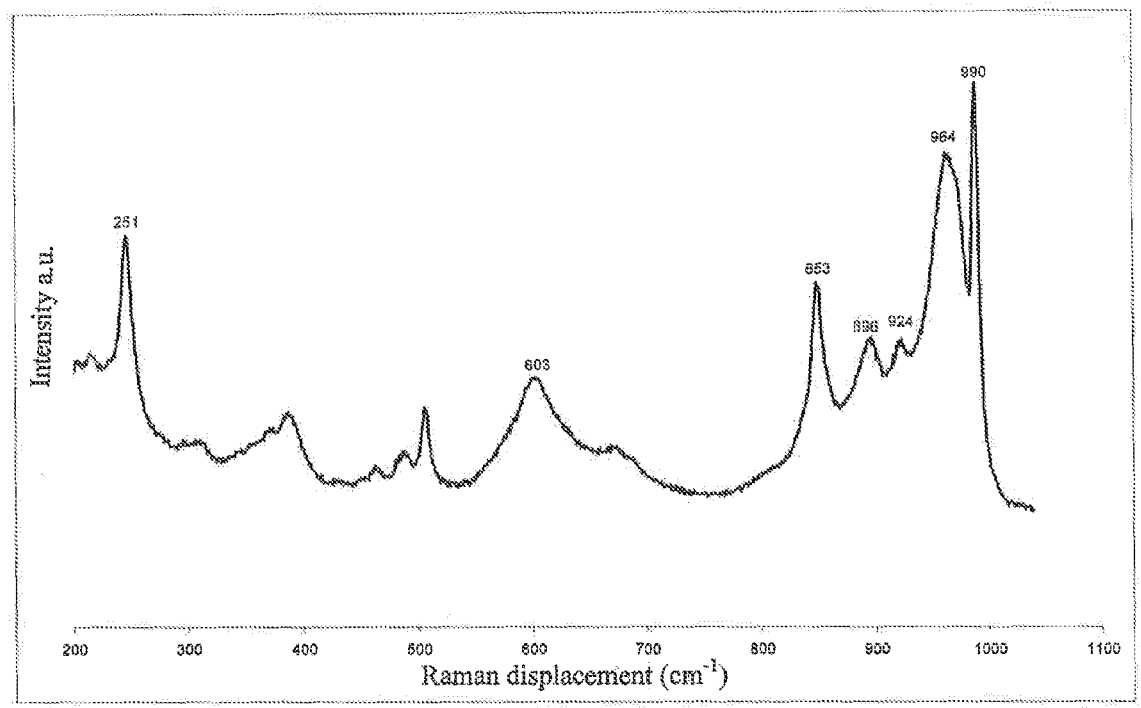

CATALYST FOR USE IN HYDROCONVERSION, COMPRISING AT LEAST ONE ZEOLITE AND METALS FROM GROUPS VIII AND VIB, AND PREPARATION OF THE CATALYST

The invention relates to a catalyst comprising a zeolite, to its preparation process and to a hydrocracking process using this catalyst.

PRIOR ART

Hydrocracking heavy oil cuts is a very important refining process which can be used to produce, from surplus, hard to upgrade heavy feeds, lighter fractions such as gasolines, jet fuels and diesel fuel which the refiner wants in order to adapt production to the demand structure. It is a process which has been described widely in the literature.

Hydrocracking is a process that draws its flexibility from three principal elements, namely the operating conditions used, the types of catalysts employed and the fact that the hydrocracking of hydrocarbon feeds may be carried out in one or two-steps.

The hydrocracking catalysts used in the hydrocracking processes are all bifunctional in type, associating an acid function with a hydrogenating function. The acid function is provided by acid supports with surface areas which are generally in the range 150 to 800 $m^2/g$, such as halogenated aluminas (especially chlorinated or fluorinated), combinations of oxides of boron and aluminium, and usually amorphous silica-aluminas and zeolites in combination with a binder which is generally alumina-based. The hydrogenating function is provided either by one or more metals from group VIB of the periodic classification of the elements or by an association of at least one metal from group VIB of the periodic classification of the elements and at least one metal from group VIII deposited on the support.

The bifunctionality of the catalyst, i.e. the ratio, the force and the distance between the acid and hydrogenating functions, is a key parameter which the skilled person knows will influence the activity and selectivity of the catalyst. A weak acid function and a strong hydrogenating function produces low activity catalysts which generally operate at high temperatures (390-400° C. or more) and at a low hourly space velocity (HSV, expressed as the volume of feed to be treated per unit volume of catalyst per hour, generally 2 or less), but endowed with very good selectivity for middle distillates (jet fuels and gas oils). In contrast, a strong acid function and a weak hydrogenating function produces active catalysts, but they have poorer selectivities for middle distillates.

Catalysts comprising zeolites have good catalytic activity, but often have insufficient selectivities for middle distillates (jet fuels and gas oils).

The prior art testifies to a great deal of work aimed at improving the selectivity for middle distillates of zeolitic catalysts. These latter are composed of a hydrogenating phase with a composition which can vary widely (different metals), generally deposited on a support containing a zeolite, usually Y zeolite. The hydrogenating phase is active in the sulphide form.

Examples which may be cited are the studies relating to dealumination by steaming or acid attack of the Y zeolite, modification of the Y zeolite, the use of composite catalysts, or the use of small crystals of Y zeolites. Other patents such as WO2007/126419 claim the use of a mixture of zeolites such as beta and USY zeolites to improve the performances of hydrocracking catalysts.

Very little work on hydrocracking has been dedicated to a study of the nature and modification of the metallic phase in the catalyst. U.S. Pat. No. 5,232,578 may be cited, which describes a hydrocracking process which is carried out in a plurality of catalytic beds with catalysts having different metals contents, patent application FR11/00043, which describes the use of two distinct metallic phases, or U.S. Pat. No. 6,524,470, which describes adding a promoter.

For the hydrotreatment reactions, the addition of an organic compound to mono-functional hydrotreatment catalysts to improve their activity in HDS, HDA or HDA is now well known to the skilled person. Many patents protect the use of different ranges of organic compounds, such as mono-, di- or poly-alcohols.

Patent WO11080407 proposes a process for the preparation and use, in hydrotreatment processes, of a catalyst comprising metals from groups VIB and VIII, an amorphous support based on alumina, phosphorus, a dialkyl C1-C4 succinate and a hydrodehydrogenating function, the Raman spectrum of the catalyst comprising the most intense characteristic bands of Keggin heteropolyanions (974 and/or 990 $cm^{-1}$), C1-C4 dialkyl succinate and acetic acid (896 $cm^{-1}$).

The present application proposes a means for improving the selectivity for middle distillates of zeolitic catalysts while retaining or improving the catalytic activity.

DESCRIPTION OF THE INVENTION

The present invention concerns a catalyst containing a support comprising at least one binder and at least one zeolite having at least one series of channels the opening of which is defined by a ring containing 12 oxygen atoms, said catalyst comprising phosphorus, at least one C1-C4 dialkyl succinate, acetic acid and a hydrodehydrogenating function comprising at least one element from group VIB and at least one element from group VIII, the Raman spectrum of the catalyst comprising bands at 990 and/or 974 $cm^{-1}$, characteristic of at least one Keggin heteropolyanion, the characteristic bands of said succinate and the characteristic principal band of acetic acid at 896 $cm^{-1}$.

The invention also concerns its preparation process, which will be described below. This catalyst can be used for the hydroconversion (hydrocracking) of hydrocarbon feeds.

It can be used to improve catalytic performance (in particular the selectivity for middle distillates at iso-conversion) compared with prior art catalysts. In fact, it has been shown that the use of a pairing of C1-C4 dialkyl succinate, in particular dimethyl, and acetic acid on a dried catalytic precursor comprising one or a mixture of several zeolites and metals from groups VIB and VIII surprisingly leads to substantially improved selectivity for middle distillates at iso-conversion compared with that obtained on the corresponding conventional catalysts. Carrying out the invention means that a gain in activity can be obtained, but not to the detriment of the selectivity for middle distillates.

The catalyst obtained has a characteristic Raman spectrum having the following:
1) characteristic bands of Keggin type heteropolyanion or heteropolyanions, $PXY_{11}O_{40}{}^{x-}$ and/or $PY_{12}O_{40}{}^{x-}$, where Y is a metal from group VIB and X is a metal from group VIII. According to Griboval, Blanchard, Payen, Fournier, Dubois in Catalysis Today 45 (1998), 277, FIG. 3e), the principal bands of the structure $PCoMo_{11}O_{40}{}^{x-}$ for the dried catalyst are at 232, 366, 943, 974 $cm^{-1}$. The most intense characteristic band of this type of lacunary Keggin HPA is located at 974 $cm^{-1}$. According to Griboval, Blanchard, Gengembre, Payen, Fournier, Dubois, Bernard in Journal of Catalysis 188

(1999), 102, FIG. 1a), the principal bands of $PMo_{12}O_{40}^{x-}$ in the bulk state of the HPA, for example with cobalt as a counter ion, are at 251, 603, 902, 970, 990 cm$^{-1}$. The most intense characteristic band of this Keggin HPA is at 990 cm$^{-1}$. M T Pope, in "Heteropoly and Isopoly Oxometallates", Springer Verlag, p 8, also informs us that these bands are not characteristic of the nature of atom X or Y, but rather of the structure of the complete, lacunary or substituted Keggin HPA;

2) characteristic bands of the dialkyl succinate(s) used. The Raman spectrum of dimethyl succinate constitutes a unique fingerprint of this molecule. In the 300-1800 cm$^{-1}$ zone of the spectrum, this spectrum is characterized by the following series of bands (only the most intense bands are reported, in cm$^{-1}$): 391, 853 (most intense band), 924, 964, 1739 cm$^{-1}$. The spectrum of diethyl succinate includes the following principal bands in the spectral zone under consideration: 861 (most intense band), 1101, 1117 cm$^{-1}$. Similarly, for dibutyl succinate: 843, 1123, 1303, 1439, 1463 cm$^{-1}$ and for diisopropyl succinate: 833, 876, 1149, 1185, 1469 (most intense band), 1733 cm$^{-1}$.

3) characteristic bands of acetic acid; the principal bands are at: 448, 623, 896 cm$^{-1}$. The most intense band is at 896 cm$^{-1}$.

The exact position of the bands, their shapes and their relative intensities may vary to a certain extent as a function of the spectrum recording conditions, but they remain characteristic of this molecule. The Raman spectra of organic compounds are also well documented, either in Raman spectrum databases (see, for example, the Spectral Database for Organic Compounds, http://riodb01.ibase.aist.go.jp/sdbs/cgi-bin/direct_frame_top.cgi) or from the product suppliers (see, for example, www.sigmaaldrich.com).

The Raman spectra were obtained with a dispersive Raman type spectrometer provided with an ionized argon laser (514 nm). The laser beam was focused on the sample using a microscope provided with a ×50 long working length objective. The power of the laser at the sample was of the order of 1 mW. The Raman signal emitted by the sample was collected by the same objective and dispersed using a 1800 lines/mm grating then collected by a CCD detector. The spectral resolution obtained was of the order of 0.5 cm$^{-1}$. The spectral zone recorded was in the range 300 to 1800 cm$^{-1}$. The acquisition period was fixed at 120 s for each recorded Raman spectrum.

Preferably, the dialkyl succinate used is dimethyl succinate, and the spectrum of the catalyst has principal Raman bands at 990 and/or 974 cm$^{-1}$, characteristic of Keggin heteropolyanion(s), and at 853 cm$^{-1}$, characteristic of dimethyl succinate, and at 896 cm$^{-1}$, characteristic of acetic acid.

Preferably, the catalyst of the invention comprises a support formed by one or a mixture of zeolites (as defined in the invention; preferably, zeolites of the Y and/or beta type) and at least one binder which is preferably alumina and/or silica-alumina. Preferably, the support is constituted by alumina and zeolite, or silica-alumina and zeolite.

The catalyst of the invention may also comprise boron and/or fluorine and/or silicon.

A process for preparing the catalyst of the invention is also described, which comprises at least one step for impregnation of a dried catalytic precursor at a temperature of less than 180° C., optionally containing phosphorus and a hydrodehydrogenating function as well as a support based on at least one zeolite shaped in a binder, using an impregnation solution comprising a combination of acetic acid and C1-C4 dialkyl succinate and the phosphorus compound, if this has not all been introduced already, followed by a step for maturation of said impregnated catalytic precursor, then a step for drying at a temperature of less than 180° C., without a subsequent calcining step; the catalyst obtained preferably undergoes a sulphurization step.

DETAILED DESCRIPTION

The preparation of a catalyst in accordance with the invention comprises the following steps in succession which will be described in detail below:

a) at least one step for impregnating a support comprising at least one binder and at least one zeolite having at least one series of channels the opening of which is defined by a ring containing 12 oxygen atoms, using at least one solution containing the elements of the hydrodehydrogenating function and phosphorus; the product obtained is termed the "catalytic precursor";

b) drying at a temperature of less than 180° C. without subsequent calcining; the product obtained is termed the "dried catalytic precursor";

c) at least one step for impregnation with an impregnation solution comprising at least one C1-C4 dialkyl succinate, acetic acid and at least one compound of phosphorus if it has not been introduced in its entirety in step a); the product obtained is termed the "impregnated dried catalytic precursor";

d) a maturation step;

e) a step for drying at a temperature of less than 180° C. without a subsequent calcining step; the product obtained is termed the "catalyst".

Preferably, the product obtained at the end of step e) undergoes a sulphurization step f).

As will be described below, the catalyst of the invention is preferably prepared in the following embodiments, taken alone or in combination: the support is based on at least one zeolite shaped in at least one binder; all of the hydrogenating function is introduced during step a); the dialkyl succinate is dimethyl succinate; step c) is carried out in the absence of solvent; step d) is carried out at a temperature of 17° C. to 50° C. and step e) is carried out at a temperature in the range 80° C. to 160° C.

Highly preferably, the preparation of the catalyst of the invention comprises the following steps in succession:

a) at least one step for dry impregnation of said support based on at least one zeolite shaped in a binder, using a solution containing all of the elements of the hydrodehydrogenating function and phosphorus;

b) drying at a temperature in the range 75° C. to 130° C. without subsequent calcining;

c) at least one step for dry impregnation with an impregnation solution comprising dimethyl succinate and acetic acid;

d) a maturation step at 17-50° C.;

e) a step for drying at a temperature in the range 80° C. to 160° C. without a subsequent calcining step.

The catalytic precursor containing the hydrodehydrogenating function and the support based on at least one zeolite shaped in at least one binder, as well as its mode of preparation, are described below.

Said catalytic precursor obtained at the end of step a) of the process of the invention may primarily be prepared using any of the methods that are familiar to the skilled person.

Said catalytic precursor contains a hydrodehydrogenating function and optionally contains phosphorus and/or boron and/or fluorine as a dopant, as well as the support based on at least one zeolite shaped in a binder. The hydrodehydrogenating function comprises at least one element from group VIB and at least one element from group VIII.

Said catalytic precursor contains a support based on at least one zeolite, advantageously shaped by using a porous binder, preferably amorphous, constituted by at least one refractory oxide. Said binder is advantageously selected from the group formed by alumina, silica, clays, titanium oxide, boron oxide and zirconia, used alone or as a mixture. The binder may be constituted by a mixture of at least two of the oxides cited above, preferably silica-alumina. Aluminates may also be selected. Preferably, binders containing alumina are used, in any of its forms known to the skilled person, for example gamma alumina. Preferred binders are alumina and silica-alumina.

Said catalytic precursor contains a support based on at least one zeolite which comprises at least one series of channels with an opening defined by a ring containing 12 oxygen atoms (12MR). Said zeolite is advantageously selected from the zeolites defined in the classification "Atlas of Zeolite Framework Types, 6th revised edition", Ch. Baerlocher, L. B. Mc Cusker, D. H. Olson, $6^{th}$ Edition, Elsevier, 2007, Elsevier" having at least one series of channels with a pore opening defined by a ring containing 12 oxygen atoms. The zeolite initially used, before being modified, advantageously additionally contains at least one series of channels with a pore opening defined by a ring containing 12 oxygen atoms (12MR), at least one series of channels with a pore opening defined by a ring containing 8 oxygen atoms (8MR) and/or at least one series of channels with a pore opening defined by a ring containing 10 oxygen atoms (10MR).

The zeolite contained in the support for said catalytic precursor may advantageously contain at least one other element T, which differs from silicon and aluminium, integrated in the tetrahedral form into the framework of the zeolite. Preferably, said element T is selected from iron, germanium, boron and titanium and represents a proportion by weight in the range 2% to 30% of the set of constituent atoms of the zeolitic framework other than the oxygen atoms. The zeolite thus has an atomic ratio (Si+T)/Al in the range 2 to 200, preferably in the range 3 to 100 and more preferably in the range 4 to 80, T being as defined above.

Preferably, the zeolite initially used is selected from the group FAU, BEA, ISV, IWR, IWW, MEI, UWY; more preferably, the initial zeolite is selected from the group FAU and BEA. Preferably, it is a FAU and/or BEA type zeolite, such as Y and/or beta zeolite.

The zeolite used in accordance with the invention may have undergone treatments in order to stabilize or create mesopores. These modifications are carried out by at least one of the dealumination techniques that are known to the skilled person, for example a hydrothermal treatment or acid attack. Preferably, this modification is carried out by a combination of three types of operations known to the skilled person: hydrothermal treatment, ion exchange and acid attack. Said zeolite may also undergo treatments known as desilication, using basic solutions, and more specifically and in a non-limiting manner treatments with NaOH or $Na_2CO_3$, which may or may not be combined with a dealumination treatment.

Although this is not limiting, the modified or unmodified zeolite used in the support may be in the form of a powder, ground powder, suspension, or suspension which has undergone deagglomeration. Thus, for example, the zeolite may advantageously be taken up into acidulated or non-acidulated suspension at a concentration adjusted to the final zeolite content envisaged for the support. This suspension, normally termed a slip, is then advantageously mixed with the precursors of the matrix.

In a preferred implementation of the preparation, the zeolite may advantageously be introduced as the support is being shaped with the elements that constitute the matrix. As an example, in this preferred implementation of the present invention, the zeolite of the invention is added to a moist alumina gel during the support shaping step.

In accordance with another preferred implementation of the preparation, the zeolite may be introduced during synthesis of the matrix. As an example, in this preferred implementation of the present invention, the zeolite is added during synthesis of the silico-alumina matrix; the zeolite may be added to a mixture composed of an alumina compound in an acid medium with a completely soluble silica compound.

The support may be shaped using any technique which is known to the skilled person. Shaping may be carried out, for example, by extrusion, pelletization, the oil drop method, by rotary plate granulation or by any other method familiar to the skilled person.

The catalysts used in the process of the invention are advantageously in the shape of spheres or extrudates. However, advantageously, the catalyst is in the form of extrudate with a diameter in the range 0.5 to 5 mm, more particularly in the range 0.7 to 2.5 mm. The shapes are cylindrical (and may or may not be hollow), twisted cylinders, multilobed (2, 3, 4 or 5 lobes, for example), or rings. The trilobal shape is preferred, but any other shape may be used. The catalysts of the invention may optionally be manufactured and used in the form of a crushed powder, tablets, rings, beads or wheels.

The hydrodehydrogenating function of said catalytic precursor is provided by at least one element from group VIB and by at least one element from group VIII. The total quantity of hydrodehydrogenating elements is advantageously more than 6% by weight of the oxide with respect to the total catalyst weight. The preferred elements from group VIB are molybdenum and tungsten. The preferred elements from group VIII are non-noble elements, in particular cobalt and nickel.

Advantageously, the hydrogenating function is selected from the group formed by the following combinations of elements: nickel-molybdenum or nickel-cobalt-molybdenum, or nickel-molybdenum-tungsten.

The molybdenum precursors which may be used are also well known to the skilled person. Reference should be made to patent application WO-2011/080407, which describes these precursors as well as those of tungsten, and more generally those of elements from groups VIII and VIB.

The quantities of precursors of elements from group VIB are advantageously in the range 5% to 40% by weight of oxides with respect to the total catalytic precursor weight, preferably in the range 8% to 37% by weight and highly preferably in the range 10% to 35% by weight.

The quantity of precursors of group VIII elements is advantageously in the range 1% to 10% by weight of oxides with respect to the total catalytic precursor weight, preferably in the range 1.5% to 9% by weight and highly preferably in the range 2% to 8% by weight.

The hydrodehydrogenating function of said catalytic precursor may advantageously be introduced into the catalyst at various stages of the preparation and in a variety of manners. Said hydrodehydrogenating function may advantageously be introduced in part during shaping of said amorphous support or, as is preferable, after shaping. Advantageously, all of the hydrodehydrogenating function is introduced during step a).

In the case in which the hydrodehydrogenating function is introduced in part during shaping of said amorphous support, it may be introduced in part (for example at most 10% by weight of the element(s) from group VIB, is introduced by mixing) only at the time of mixing with an alumina gel selected as the matrix, the remainder of the hydrogenating element(s) being introduced subsequently. Preferably, when the hydrodehydrogenating function is introduced in part at the time of mixing, the proportion of element(s) from group VIB introduced during said step is less than 5% of the total quantity of element(s) from group VIB introduced onto the final catalyst. Preferably, the element from group VIB is introduced at the same time as the element from group VIII, irrespective of the mode of introduction.

In the case in which the hydrodehydrogenating function is introduced at least in part and preferably in its entirety after shaping said amorphous support, said hydrodehydrogenating function is advantageously introduced onto the amorphous support by one or more steps for excess solution impregnation carried out on the shaped and calcined support or, as is preferable, by one or more dry impregnation steps, preferably by dry impregnation of said shaped and calcined support, using solutions containing the precursor salts of the metals. Highly preferably, the hydrodehydrogenating function is introduced in its entirety after shaping said amorphous support, by dry impregnation of said support using an impregnation solution containing the precursor salts of the metals. Introduction of said hydrodehydrogenating function may also advantageously be carried out by one or more steps for impregnation of the shaped and calcined support, using a solution of precursor(s) of the active phase. In the case in which the elements are introduced in a plurality of steps for impregnation of the corresponding precursor salts, a step for intermediate drying of the catalyst is generally carried out at a temperature in the range 50° C. to 180° C., preferably in the range 60° C. to 150° C. and more preferably in the range 75° C. to 130° C.

Phosphorus is also introduced into the catalyst. Another catalyst dopant may also be introduced which is preferably selected from boron and fluorine, used alone or as a mixture. The dopant is an added element which has no catalytic nature in itself, but which increases the catalytic activity of the metal(s). Said dopant may advantageously be introduced alone or as a mixture with at least one of the elements of the hydrodehydrogenating function. It may also be introduced upon synthesis of the support. It may also be introduced just before or just after peptizing the selected matrix such as, for example and preferably, aluminium oxyhydroxide (boehmite) alumina precursor. Said dopant may also advantageously be introduced as a mixture with the precursor(s) of the hydrodehydrogenating function, in its entirety or in part onto the amorphous shaped support, preferably alumina or silica-alumina in the extruded form, by dry impregnation of said amorphous support using a solution containing the precursor salts of the metals and the precursor(s) of the dopant(s). Finally, the dopant, in particular when it is phosphorus, may be introduced with the dialkyl succinate.

Sources of boron and fluorine are also described in application WO-2011/30807.

The preferred source of phosphorus is orthophosphoric acid, $H_3PO_4$, but its salts and esters such as ammonium phosphates are also suitable. The phosphorus may also be introduced at the same time as the element(s) from group VIB in the form of Keggin, lacunary Keggin, substituted Keggin or Strandberg type heteropolyanions.

The dopant is advantageously introduced into the catalytic precursor in a quantity of oxide of said dopant with respect to the catalyst:

in the range 0 to 40% by weight, preferably in the range 0 to 30% by weight, and more preferably in the range 0 to 20% by weight, preferably in the range 0 to 15% and still more preferably in the range 0 to 10% by weight when said dopant is boron; when boron is present, the minimum quantity is preferably 0.1% by weight;

in the range 0.1% to 20% by weight, preferably in the range 0.1% to 15% by weight and more preferably in the range 0.1% to 10% by weight, when said dopant is phosphorus;

in the range 0 to 20% by weight, preferably in the range 0 to 15% by weight and more preferably in the range 0 to 10% by weight when said dopant is fluorine; when fluorine is present, the minimum quantity is preferably 0.1% by weight.

Phosphorus is always present. The phosphorus is introduced at least by impregnating the catalytic precursor during step a) and/or onto the dried catalytic precursor during step c). This is also preferably the case for the other dopants. However, as stated above, the dopants may be introduced in part during preparation of the support (shaping included) or in its entirety (with the exception of phosphorus).

Introducing said hydrodehydrogenating function and optional dopant into or onto the shaped calcined support is then advantageously followed by a drying step b) during which the solvent for the metallic precursor salts of the metal oxide(s) (the solvent is generally water) is eliminated at a temperature in the range 50° C. to 180° C., preferably in the range 60° C. to 150° C. or in the range 65° C. to 150° C., and highly preferably in the range 70° C. to 140° C. or even in the range 75° C. to 130° C. The step for drying the "dried catalytic precursor" obtained thereby is never followed by a step for calcining in air, for example at a temperature of more than 200° C.

Preferably, in step a) of the process of the invention, said "catalytic precursor" is obtained by dry impregnation of a solution comprising one (or more) precursors of the hydrodehydrogenating function and of phosphorus onto a calcined support based on at least one zeolite shaped in a shaped binder, followed by drying at a temperature of less than 180° C., preferably in the range 50° C. to 180° C., more preferably in the range 60° C. to 150° C. and still more preferably in the range 75° C. to 130° C.

Thus, a "dried catalytic precursor" is obtained at the end of step b).

It is possible in step a) of the process of the invention to prepare an impregnation solution containing at least one dopant selected from boron and fluorine, used alone or as a mixture.

Still more preferably, the "catalytic precursor" in step a) of the process of the invention is prepared with an impregnation solution containing at least one precursor of each element of the hydrodehydrogenating function, in the presence of a phosphorus precursor, and the support based on at least one zeolite shaped in a binder constituted by alumina or silica-alumina.

In accordance with step c) of the process of the invention, said dried catalytic precursor is impregnated with an impregnation solution comprising at least one C1-C4 dialkyl succinate (in particular dimethyl succinate) and acetic acid.

Said compounds are advantageously introduced into the impregnation solution of step c) of the process of the invention in a quantity corresponding to:

1) a molar ratio of dialkyl (for example dimethyl) succinate to the impregnated element(s) from group VIB of the catalytic precursor in the range 0.15 to 2.5 mole/mole, preferably in the range 0.3 to 2.0 mole/mole, more preferably in the range 0.5 to 1.8 mole/mole and still more preferably in the range 0.8 to 1.6 mole/mole; and 2) a molar ratio of acetic acid to impregnated element(s) from group VIB of the catalytic precursor in the range 0.1 to 10 mole/mole, preferably in the range 0.5 to 8 mole/mole, more preferably in the range 1.3 to 7.5 mole/mole and highly preferably in the range 1.5 to 7 mole/mole.

In accordance with step c) of the process of the invention, the combination of dialkyl succinate and acetic acid is introduced onto the dried catalytic precursor by means of at least one impregnation step, preferably in a single step for impregnating an impregnation solution onto said catalytic precursor.

Said combination may advantageously be deposited in one or more steps either by slurry impregnation or by excess impregnation, or by dry impregnation, or using any other means known to the skilled person.

In a preferred implementation of step c) of the preparation process of the invention, step c) is a single dry impregnation step.

In accordance with step c) of the process of the invention, the impregnation solution of step c) comprises at least a combination of C1-C4 dialkyl succinate (in particular dimethyl) and acetic acid.

The impregnation solution used in step c) of the process of the invention may be completed using any non-protic solvent known to the skilled person, in particular comprising toluene or xylene.

The impregnation solution used in step c) of the process of the invention may be completed using any polar solvent which is known to the skilled person. Said polar solvent which is employed is advantageously selected from the group formed by methanol, ethanol, water, phenol and cyclohexanol, used alone or as a mixture. Said polar solvent used in step c) of the process of the invention may also advantageously be selected from the group formed by propylene carbonate, DMSO (dimethylsulphoxide) and sulpholane, used alone or as a mixture. Preferably, a polar protic solvent is used. A list of the usual polar solvents and their dielectric constants may be found in the book "Solvents and Solvent Effects in Organic Chemistry" by C Reichardt, Wiley-VCH, $3^{rd}$ edition, 2003, pages 472-474). Highly preferably, the solvent optionally used is ethanol.

Preferably, no solvent is employed in the impregnation solution used in step c) of the process of the invention, meaning that industrial scale use is facilitated. Preferably, it contains only dialkyl succinate and acetic acid.

The dialkyl succinate used is preferably included in the group composed of dimethyl succinate, diethyl succinate, dipropyl succinate, diisopropyl succinate and dibutyl succinate. Preferably, the C1-C4 dialkyl succinate used is dimethyl succinate or diethyl succinate. At least one C1-C4 dialkyl succinate is used. Highly preferably, the C1-C4 dialkyl succinate used is dimethyl succinate, preferably alone.

In accordance with step d) of the preparation process of the invention, the dried impregnated catalytic precursor obtained from step c) undergoes a maturation step. It is advantageously carried out at atmospheric pressure and at a temperature in the range 17° C. to 50° C., generally for a maturation period in the range ten minutes to forty-eight hours; preferably, a period in the range thirty minutes to five hours is sufficient. Longer times are not excluded. A simple means for adjusting the maturation period is to characterize formation of the Keggin heteropolyanions by Raman spectroscopy in the dried impregnated catalytic precursor from step c) of the process of the invention. Highly preferably, to increase the productivity without modifying the quantity of reformed heteropolyanions, the maturation period is in the range thirty minutes to four hours. Still more preferably, the maturation period is in the range thirty minutes to three hours.

In accordance with step e) of the preparation process of the invention, the matured impregnated dried catalytic precursor from step d) undergoes a drying step at a temperature of less than 180° C., with no subsequent calcining step, for example at a temperature of more than 200° C.

The aim of this step is to obtain a catalyst which can be transported, stored and handled, in particular to charge the hydrotreatment unit. Advantageously, depending on the selected embodiment of the invention, all or a portion of any solvent which has served to introduce the combination of C1-C4 dialkyl (in particular dimethyl) succinate and acetic acid is removed. In all cases, and in particular in the case in which the combination of C1-C4 dialkyl (in particular dimethyl) succinate and acetic acid is used alone, the catalyst is made to look dry in order to prevent the extrudates from sticking to each other during the steps of transport, storage, handling or charging.

The drying step e) of the process of the invention is advantageously carried out using any technique which is known to the skilled person. It is advantageously carried out at atmospheric pressure or at reduced pressure. Preferably, this step is carried out at atmospheric pressure.

This step e) is advantageously carried out at a temperature of more than 50° C. and less than 180° C., preferably in the range 60° C. to 170° C. and highly preferably in the range 80° C. to 160° C.

It is advantageously carried out in a traversed bed using air or any other hot gas. Preferably, when drying is carried out in a fixed bed, the gas used is either air or an inert gas such as argon or nitrogen. Highly preferably, drying is carried out in the presence of nitrogen in a traversed bed.

Preferably, the duration of this step is in the range 15 minutes to 4 hours, more preferably in the range 30 minutes to 3 hours, and highly preferably in the range 1 hour to 3 hours.

At the end of step e) of the process of the invention, a dried catalyst is obtained which does not undergo any subsequent calcining steps in air, for example at a temperature of more than 200° C.

The catalyst obtained at the end of step d) or step e) has a Raman spectrum comprising the most intense bands at 990 and 974 $cm^{-1}$ (Keggin type heteropolyanions), the bands corresponding to the succinate (for dimethyl succinate, the most intense band is at 853 $cm^{-1}$) and the characteristic bands for acetic acid, the most intense of which is 896 $cm^{-1}$.

Before using it, it is advantageous to transform the dried or calcined catalyst into a sulphurized catalyst in order to form its active species. This activation or sulphurization phase is carried out using methods which are well known to the skilled person, advantageously in a sulpho-reducing atmosphere in the presence of hydrogen and hydrogen sulphide.

At the end of step e) of the process of the invention, said dried catalyst obtained thus advantageously undergoes a step f) for sulphurization without an intermediate calcining step.

Said dried catalyst is advantageously sulphurized ex situ or in situ. The sulphurizing agents are gaseous $H_2S$ or any other compound containing sulphur used to activate hydrocarbon feeds with a view to sulphurizing the catalyst. Said sulphur-containing compounds are advantageously selected from alkyldisulphides such as, for example, dimethyldisulphide (DMDS), alkylsulphides such as dimethyl sulphide, n-butylmercaptan, polysulphide compounds of the tertionionylpolysulphide type such as TPS-37 or TPS-54, sold by the supplier ARKEMA, or any other compound known to the skilled person that can be used to sulphurize a catalyst effectively. Preferably, the catalyst is sulphurized in situ in the presence of a sulphurizing agent and a hydrocarbon feed. Highly preferably, the catalyst is sulphurized in situ in the presence of a hydrocarbon feed supplemented with dimethyldisulphide.

Hydroconversion Process

The invention pertains to a process for the hydroconversion of hydrocarbon feeds in the presence of a catalyst of the invention.

The hydroconversion (hydrocracking) process operates in the presence of hydrogen, generally at a temperature of more than 200° C., a pressure of more than 1 MPa, the space velocity being in the range 0.1 to 20 h$^{-1}$ and the quantity of hydrogen introduced being such that the volume ratio of liters of hydrogen/liters of hydrocarbon is in the range 80 to 5000 L/L.

Preferably, the hydrocracking process is operated in the presence of hydrogen, at a temperature of more than 200° C., preferably in the range 250° C. to 480° C., more preferably in the range 320° C. to 450° C., highly preferably in the range 330° C. to 435° C., at a pressure of more than 1 MPa, preferably in the range 2 to 25 MPa, more preferably in the range 3 to 20 MPa, at an hourly space velocity in the range 0.1 to 20 h$^{-1}$, preferably 0.1 to 6 h$^{-1}$, more preferably in the range 0.2 to 3 h$^{-1}$, and the quantity of hydrogen introduced is such that the volume ratio of liters of hydrogen/liters of hydrocarbon is in the range 80 to 5000 L/L, usually in the range 100 to 3000 L/L.

These operating conditions employed in these processes can generally attain conversions per pass of products with boiling points below 300° C., preferably less than 340° C. and more preferably less than 370° C., of at least 50% by weight, more preferably in the range 20% to 100%, but most generally in the range 60-95% by weight.

Feeds

A wide variety of feeds can be treated using the processes of the invention described above. They advantageously contain at least 20% by volume, preferably at least 80% by volume of compounds boiling above 340° C.

The feed is advantageously selected from LCO (light cycle oil), atmospheric distillates, vacuum distillates such as, for example, those obtained from straight run crude distillation or from conversion units such as a FCC, a coker or a visbreaking unit, feeds deriving from units for extracting aromatics from lubricant oil bases or from solvent dewaxing of lubricant oil bases, distillates originating from processes for fixed bed, ebullated bed or slurry desulphurization or hydroconversion of AR (atmospheric residues) and/or RSV (vacuum residues) and/or deasphalted oils, and of deasphalted oils, used alone or as a mixture. The above list is not limiting. Paraffins obtained from the Fischer-Tropsch process are excluded. Said feeds preferably have a T5 boiling point of more than 340° C., preferably more than 370° C., i.e. 95% of the compounds present in the feed have a boiling point of more than 340° C., preferably more than 370° C.

The quantity of nitrogen in the feeds treated in the processes of the invention is advantageously more than 500 ppm by weight, preferably in the range 500 to 10000 ppm by weight, more preferably in the range 700 to 5000 ppm by weight and still more preferably in the range 1000 to 4000 ppm by weight. The sulphur content in the feeds treated in the processes of the invention is advantageously in the range 0.01% to 5% by weight, preferably in the range 0.2% to 4% by weight and more preferably in the range 0.5% to 3% by weight.

The feed may optionally contain metals. The cumulative nickel and vanadium content of the feeds treated in the processes of the invention is preferably less than 10 ppm by weight, more preferably less than 5 ppm by weight and still more preferably 1 ppm by weight.

The feed may optionally contain asphaltenes. The asphaltenes content is generally less than 3000 ppm by weight, preferably less than 1000 ppm by weight, and more preferably less than 200 ppm by weight.

Guard Beds

In the case in which the feed contains compounds of the resins and/or asphaltenes and/or metals type, it is advantageously to cause the feed pass initially over a bed of catalyst or adsorbent that differs from the hydrocracking or hydrotreatment catalyst. The catalysts or guard beds used in accordance with the invention have the shape of spheres or extrudates. However, the catalyst is advantageously in the shape of extrudates with a diameter in the range 0.5 to 5 mm, more particularly in the range 0.7 to 2.5 mm. The shapes are cylindrical (they may or may not be hollow), twisted cylinders, multilobes (2, 3, 4 or 5 lobes, for example), or rings. The cylindrical shape is preferred, but any other shape may be used.

In order to accommodate the presence of contaminants and/or poisons in the feed, in another preferred embodiment, the guard catalysts may have more particular geometric shapes in order to increase their void fraction. The void fraction of these catalysts is in the range 0.2 to 0.75. Their external diameter may be in the range 1 to 35 mm. A non-limiting list of possible particular shapes that can be cited is as follows: hollow cylinders, hollow rings, Raschig rings, hollow toothed rings, hollow crenellated cylinders, pentaring wagon wheels, multiple-holed cylinders, etc.

These catalysts or guard beds may or may not have been impregnated with an active phase. Preferably, the catalysts are impregnated with a hydrodehydrogenating phase. Highly preferably, the phases CoMo, NiMo or NiCoMo are used.

These catalysts or guard beds may contain macropores. The guard beds may be those sold by Norton-Saint-Gobain, for example MacroTrap® guard beds. The guard beds may be those sold by Axens in their ACT series: ACT077, ACT645, ACT961 or HMC841, HMC845, HMC868, HF858, HM848 or HMC945. It may be particularly advantageous to superimpose these catalysts in at least two different beds of different heights. The catalysts with the highest void fraction are preferably used in the first catalytic bed or beds at the inlet to the catalytic reactor. It may also be advantageous to use at least two different reactors for these catalysts. Finally, guard beds that can be switched may also be used so that feeds containing the most asphaltenes and metals can be treated.

Implementations

The hydrocracking processes of the invention may advantageously use said catalyst as described above alone, in one or more fixed bed catalytic beds, in one or more reactors, in a once-through hydrocracking layout, with or without liquid recycling of the unconverted fraction, optionally in association with a conventional hydrotreatment catalyst located upstream of the catalyst used in the process of the present invention.

The hydrocracking processes of the invention may advantageously also use said catalyst described above alone, in just one or several ebullated bed reactors, in a hydrocracking layout known as a once-through mode, with or without liquid recycling of the unconverted fraction, optionally in association with a conventional hydrotreatment catalyst located in a fixed bed reactor or ebullated bed reactor upstream of the catalyst used in the process of the present invention.

"Once-Through" Process

The hydrocracking process of the invention may advantageously be carried out in a process known as a once-through process.

In the first place and in general, once-through hydrocracking comprises intense hydrorefining which is intended to carry out an intense hydrodenitrogenation and desulphurization of the feed before it is sent to the hydrocracking catalyst proper, in particular in the case in which it comprises a zeolite. This intense hydrorefining of the feed causes only limited conversion of the feed, into lighter fractions, which is still not sufficient and thus has to be completed over the more active hydrocracking catalyst described hereinabove. However, it should be noted that no separation is carried out between the two types of catalysts. All of the effluent from the outlet of the reactor is injected over said hydroconversion catalyst proper, and it is only then that separation of the products formed is carried out. This version of hydrocracking is known as "once-through" hydrocracking; in a variation, the unconverted fraction is recycled to the reactor with a view to a more intense conversion of the feed.

The catalyst described in the invention is thus advantageously used in a once-through hydrocracking process, in a hydroconversion zone placed downstream of a hydrorefining zone, with no intermediate separation being carried out between the two zones.

Preferably, the hydrorefining catalyst used in the first hydrorefining reaction zone, alone or in association with another conventional hydrocracking catalyst located upstream of the catalyst described in the invention, is a catalyst which optionally comprises a doping element selected from phosphorus, boron and silicon, said catalyst being based on non-noble elements from group VIII and optionally in combination with elements from group VIB on an alumina or silica-alumina support.

Fixed Bed "Once-Through" Process with Intermediate Separation

The hydrocracking process of the invention may advantageously be carried out in a fixed bed "once-through" process with intermediate separation.

Said process advantageously comprises a hydrorefining zone, a zone for partial elimination of ammonium, for example by a hot flash, and a zone comprising said hydrocracking catalyst of the invention. This process for hydrocracking hydrocarbon feeds in a single step for the production of middle distillates and possibly oil bases advantageously comprises at least a first hydrorefining reaction zone and at least a second reaction zone, in which hydrocracking of at least a portion of the effluent from the first reaction zone is carried out. This process also advantageously includes incomplete separation of ammonia from the effluent leaving the first zone. This separation is advantageously carried out using a hot intermediate flash. The hydrocracking carried out in the second reaction zone is advantageously carried out in the presence of ammonia in a quantity below the quantity present in the feed, preferably below 1500 ppm by weight, more preferably below 1000 ppm by weight and still more preferably less than 800 ppm by weight of nitrogen.

The catalyst described in accordance with the invention is thus advantageously used in a fixed bed once-through hydrocracking process with intermediate separation, in a hydrocracking zone placed downstream of a hydrorefining zone, an intermediate separation for partial elimination of the ammonia being carried out between the two zones.

Preferably, the hydrorefining catalyst used in the first hydrorefining reaction zone, alone or in association with another conventional hydrorefining catalyst located upstream of the catalyst described in the invention, is a catalyst optionally comprising a doping element selected from phosphorus, boron and silicon, said catalyst being based on non-noble elements from group VIII, optionally in combination with elements from group VIB on an alumina or silica support.

"Two-Step" Process

The hydrocracking process of the invention may advantageously be used in a "two-step" process which is aimed at maximum or even total conversion.

Two-step hydrocracking comprises a first step which, like the "once-through" process, is intended to carry out hydrorefining of the feed, but also to obtain a conversion in the first step which is in general of the order of 40% to 60%. The effluent from the first step then undergoes separation (distillation), which is usually termed intermediate, which is intended to separate the conversion products from the unconverted fraction. In the second step of a two-step hydrocracking process, only the fraction of the feed which is not converted during the first step is treated. This separation means that a two-step hydrocracking process can be more selective for middle distillates (kerosene+diesel) than a once-through process. In fact, the intermediate separation of conversion products prevents them from being "over-cracked" into naphtha and gas in the second step over the hydrocracking catalyst. Further, it should be noted that the unconverted fraction of the feed treated in the second step generally contains very small quantities of $NH_3$ as well as organic nitrogen-containing compounds, in general less than 20 ppm by weight or even less than 10 ppm by weight.

The catalytic bed configurations described in the case of a once-through process may advantageously be used in the first step of a two-step layout, whether the catalyst of the invention is used alone or in association with a conventional hydrorefining catalyst.

The catalyst described in the invention is thus advantageously used in a "two-step" hydrocracking process in the second hydrocracking step placed downstream of the first hydrorefining step, an intermediate separation being carried out between the two zones.

For "once-through" processes and for the first hydrorefining step of "two-step" hydrocracking processes, conventional hydrorefining catalysts which may advantageously be used are catalysts which may optionally comprise a doping element selected from phosphorus, boron and silicon, said catalyst being based on non-noble elements from group VIII, optionally in combination with elements from group VIB, on an alumina or silica-alumina support.

The following examples demonstrate the large gains in activity and selectivity for middle distillates for the catalysts prepared in accordance with the process of the invention compared with prior art catalysts, and illustrate the invention without in any way limiting its scope.

BRIEF DESCRIPTION OF THE DRAWING

FIG. 1 represents Raman spectra of a catalyst of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 11/04.025, filed Dec. 22, 2011 are incorporated by reference herein.

EXAMPLES

Example 1

Preparation of Catalysts 1A (not in Accordance with the Invention) and 1B (in Accordance with the Invention)

USY-1 zeolite (ultra-stable Y) with the characteristics described in Table 1 was used for the preparation of catalysts 1A and 1B.

TABLE 1

Characteristics of USY-1 zeolite

| Nature of zeolite | Name of zeolite | $SiO_2/Al_2O_3$ ratio | Cationic form | Lattice parameter (Å) | Specific surface area ($m^2/g$) |
|---|---|---|---|---|---|
| USY | USY-1 | 30 | $H^+$ | 24.28 | 780 |

A matrix composed of ultrafine tabular boehmite or alumina gel, sold by Condéa Chemie GmbH under the name SB3, was used. The support was obtained after shaping and extrusion by mixing 20% by weight of USY-1 zeolite with 80% of alumina gel. The support was then calcined at 500° C. for 2 hours in air.

A solution composed of molybdenum oxide, nickel hydroxycarbonate and phosphoric acid was added to the support by dry impregnation in order to obtain a formulation of 3.1/18.0/3.1, expressed as the % by weight of oxides with respect to the dry matter content of the final catalyst. After dry impregnation, the extrudates were left to mature in a water-saturated atmosphere for 12 h, then they were dried overnight at 90° C. This catalytic precursor was termed 1PC. Finally, the catalytic precursor 1PC was calcined at 450° C. for 2 hours to produce the calcined catalyst 1A (not in accordance with the invention).

Catalyst 1B, in accordance with the invention, was prepared by dry impregnation of the catalytic precursor 1PC with a solution comprising dimethyl succinate and acetic acid diluted in water. The envisaged quantities of dimethyl succinate (DMSU) and acetic acid (AA) were respectively 27% by weight and 18% by weight (i.e. AA/Mo=2.7 mole/mole and DMSU/Mo=1.5 mole/mole). After a maturation period of 3 hours in a closed vessel at ambient temperature, the catalyst was dried once again in a stream of nitrogen (1 NL/g/g) for 1 hour, in a traversed bed at 140° C.

The Raman spectrum of catalyst 1B, in accordance with the invention, is given in FIG. 1. The most intense characteristic bands of dimethyl succinate at 391, 853, 924 and 964 $cm^{-1}$ can be clearly identified. In the same manner, the most intense characteristic band of acetic acid at 896 $cm^{-1}$ is clearly visible. Finally, the most intense characteristic bands of the Keggin type heteropolyanions at 251, 603 and 990 $cm^{-1}$ are also clearly identifiable.

Example 2

Preparation of Catalysts 2a (not in Accordance with the Invention) and 2B (in Accordance with the Invention)

USY-2 zeolite (ultra-stable Y) with the characteristics described in Table 2 was used for the preparation of catalysts 2A (not in accordance with the invention) and 2B (in accordance with the invention).

TABLE 2

Characteristics of USY-2 zeolite

| Nature of zeolite | Name of zeolite | $SiO_2/Al_2O_3$ ratio | Cationic form | Lattice parameter (Å) | Specific surface area ($m^2/g$) |
|---|---|---|---|---|---|
| USY | USY-2 | 12 | $H^+$ | 24.35 | 740 |

A matrix composed of ultrafine tabular boehmite or alumina gel, sold by Condéa Chemie GmbH under the name SB3, was used. The support was obtained after shaping and extrusion by mixing 20% by weight of USY-1 zeolite with 80% of alumina gel. The support was then calcined at 500° C. for 2 hours in air.

A solution composed of molybdenum oxide, nickel hydroxycarbonate and phosphoric acid was added on the support by dry impregnation in order to obtain a formulation of 3.1/18.0/3.1, expressed as the % by weight of oxides with respect to the dry matter content of the final catalyst. After dry impregnation, the extrudates were left to mature in a water-saturated atmosphere for 12 h, then they were dried overnight at 90° C. This catalytic precursor was termed 2PC. Finally, the catalytic precursor 2PC was calcined at 450° C. for 2 hours to produce the calcined catalyst 2A (not in accordance with the invention).

Catalyst 2B, in accordance with the invention, was prepared by dry impregnation of the catalytic precursor 2 PC with a solution comprising dimethyl succinate and acetic acid diluted in water. The envisaged quantities of dimethyl succinate (DMSU) and acetic acid (AA) were respectively 27% by weight and 18% by weight (i.e. AA/Mo=2.7 mole/mole and DMSU/Mo=1.5 mole/mole). After a maturation period of 3 hours in a closed vessel at ambient temperature, the catalyst was dried once again in a stream of nitrogen (1 NL/g/g) for 1 hour, in a traversed bed at 140° C.

The Raman spectrum of catalyst 2B, in accordance with the invention comprises, as was the case for the Raman spectrum of catalyst 1B, the most intense characteristic bands of dimethyl succinate at 391, 853, 924 and 964 $cm^{-1}$, the most intense characteristic band of acetic acid at 896 $cm^{-1}$ and finally, the most intense characteristic bands of the Keggin type heteropolyanions at 251, 603 and 990 $cm^{-1}$.

Example 3

Preparation of Catalysts 3A (not in Accordance with the Invention) and 3B (in Accordance with the Invention)

USY-2 zeolite (ultra-stable Y) with the characteristics described in Table 2 and BETA zeolite with the characteristics shown in Table 3 were used in the preparation of catalysts 3A (not in accordance with the invention) and 3B (in accordance with the invention).

TABLE 2

Characteristics of BETA zeolite

| Nature of zeolite | Name of zeolite | $SiO_2/Al_2O_3$ ratio | Cationic form | Lattice parameter (Å) | Specific surface area ($m^2/g$) |
|---|---|---|---|---|---|
| Beta | BETA | 25 | $H^+$ | 26.2 | 680 |

Catalyst 3 was prepared using the same procedure as that employed in Examples 1 and 2, with the exception of the mixture of alumina gel and zeolite which was composed of 80% by weight of alumina gel with 17% by weight of USY-2 zeolite and 3% by weight of BETA zeolite. The impregnation solution used was equivalent, with a target final NiMoP content of 3.1/18/3.1. As was the case for Examples 1 and 2, the catalytic precursor 3PC was obtained after maturation and drying, and the calcining catalyst 3A (not in accordance) was obtained after calcining.

Catalyst 3B, in accordance with the invention, was prepared by dry impregnation of the catalytic precursor 3 PC with a solution comprising dimethyl succinate and acetic acid diluted in water. The envisaged quantities of dimethyl succinate (DMSU) and acetic acid (AA) were respectively 27% by weight and 18% by weight (i.e. AA/Mo=2.7 mole/mole and DMSU/Mo=1.5 mole/mole). After a maturation period of 3 hours in a closed vessel at ambient temperature, the catalyst was dried once again in a stream of nitrogen (1 NL/g/g) for 1 hour, in a traversed bed at 140° C.

As was the case for the Raman spectrum of catalysts 1B and 2B, the Raman spectrum of catalyst 3B in accordance with the invention comprises the most intense characteristic bands of dimethyl succinate at 391, 853, 924 and 964 $cm^{-1}$, the most intense characteristic band of acetic acid at 896 $cm^{-1}$ and finally, the most intense characteristic bands of the Keggin type heteropolyanions at 251, 603 and 990 $cm^{-1}$.

Example 4

Evaluation of Catalysts in "Once-Through" Hydrocracking of a Vacuum Distillate

The catalysts for which the preparations are described in the preceding examples were used under high conversion (60-100%) hydrocracking conditions. The oil feed was a vacuum distillate which had undergone a first hydrorefining step over a catalyst the principal characteristics of which are given in Table 4.

No intermediate separation step was carried out between the prior hydrorefining step and the hydrocracking step.

TABLE 4

| Characteristics of feed used | |
|---|---|
| Density (20/4) | 0.869 |
| Sulphur (ppm by weight) | 502 |
| Nitrogen (ppm by weight) | 10 |
| Simulated distillation | |
| initial point | 298° C. |
| 10% point | 369° C. |
| 50% point | 427° C. |
| 90% point | 481° C. |
| End point | 538° C. |

0.6% by weight of aniline and 2% by weight of dimethyldisulphide were added to the feed in order to simulate the partial pressures of $H_2S$ and of $NH_3$ present in the second hydrocracking step. The prepared feed was then injected into the hydrocracking test unit which comprised a fixed bed reactor in feed upflow mode into which 80 ml of catalyst had been introduced. The catalyst was sulphurized by a n-hexane/DMDS+aniline mixture up to 320° C. It should be noted that any in situ or ex situ sulphurization method is suitable. Once sulphurization was complete, the feed described in Table 4 could be transformed. The operating conditions for the test unit are given in Table 5.

TABLE 5

| Catalyst test conditions. | |
|---|---|
| Total pressure | 9 MPa |
| Catalyst | 80 $cm^3$ |
| Hydrogen flow rate | 80 L/h |
| Feed flow rate | 80 $cm^3/h$ |

The catalytic performances are expressed as the temperature which can produce an uncorrected conversion rate of 70%, and by the middle distillates (MD) yields. These catalytic performances were measured in the catalyst after a stabilization period, generally at least 48 hours, had been allowed.

The gross conversion GC is taken to be: GC=% by weight of 380° C. minus of the effluent, where "380° C. minus" represents the fraction, distilled at a temperature of 380° C. or lower.

The middle distillates yield (150-380° C.) was equal to the % by weight of compounds with a boiling point in the range 150° C. to 380° C. in the effluents.

The reaction temperature was fixed so as to reach a gross conversion GC equal to 70% by weight.

TABLE 6

| Catalytic activities of catalysts in hydrocracking. | | | | | |
|---|---|---|---|---|---|
| Catalyst | T(° C.) | Naphtha yield (wt %) | Kerosene yield (wt %) | Gas oil yield (wt %) | Middle distillates yield( wt %) |
| 1A | 378 | 17 | 24.6 | 21.3 | 45.9 |
| 1B | 376 | 15.5 | 25.4 | 22.5 | 47.9 |
| 2A | 370 | 17.1 | 25.0 | 21.1 | 46.1 |
| 2B | 368 | 15.8 | 25.2 | 22.5 | 47.7 |
| 3A | 366 | 17.8 | 25.1 | 20.3 | 45.4 |
| 3B | 364 | 16.2 | 25.3 | 21.5 | 46.8 |

The catalysts in accordance with the invention (1B, 2B and 3B) clearly demonstrate superior catalytic performances to those of the catalysts which were not in accordance with the invention (1A, 2A and 3A).

Catalyst 1B showed a gain of 2.0% by weight of middle distillates compared with catalyst 1A, and a gain in activity of 2° C. Catalyst 2B was more selective than catalyst 2A by 1.6% by weight and more active by 2° C. Catalyst 3B had an improved middle distillates yield of 1.4% by weight, with a gain of 2° C. in reaction temperature compared with catalyst 3A which was not in accordance.

The quantity of naphtha produced was substantially reduced when using a catalyst in accordance with the invention. Because of the invention, a gain in selectivity for middle distillates was obtained without a loss of activity.

These selectivity increases are very large when the refiner's margins are considered: a gain of 2° C. represents 1 to 3 extra months of industrial cycle (hence a gain in productivity) and a gain of 2 selectivity points represents a production increase of 1-3% for middle distillates (increase in quantity of high added value products).

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst containing a support comprising at least one binder and at least one zeolite having at least one series of channels the opening of which is defined by a ring containing 12 oxygen atoms, said catalyst comprising phosphorus, at least one C1-C4 dialkyl succinate, acetic acid and a hydrodehydrogenating function comprising at least one element from group VIB and at least one element from group VIII, the Raman spectrum of the catalyst comprising bands at 990 and/or 974 cm$^{-1}$, characteristic of at least one Keggin heteropolyanion, the succinate having characteristic bands and the acetic acid having a characteristic principal band at 896 cm$^{-1}$.

2. A catalyst according to claim 1, in which the dialkyl succinate is dimethyl succinate and in which the Raman spectrum of the catalyst has principal bands at 990 and/or 974 cm$^{-1}$ which are characteristic of Keggin heteropolyanions, and at 853 cm$^{-1}$, which is characteristic of dimethyl succinate and at 896 cm$^{-1}$, which is characteristic of acetic acid.

3. A catalyst according to claim 1, in which the dialkyl succinate is diethyl succinate, dibutyl succinate or diisopropyl succinate.

4. A catalyst according to claim 1, comprising a support constituted by alumina and zeolite.

5. A catalyst according to claim 1, comprising a support constituted by silica-alumina and zeolite.

6. A catalyst according to claim 1, also comprising boron and/or fluorine.

7. A catalyst according to claim 1, in which the zeolite is zeolites of type FAU, BEA, ISV, IWR, IWW, MEI or UWY.

8. A catalyst according to claim 7, in which the zeolite is Y zeolite and/or beta zeolite.

9. A catalyst according to claim 1, which is sulphurized.

10. A process for the preparation of a catalyst according to claim 1, said process comprising in succession:
   a) impregnating a support, comprising at least one binder and at least one zeolite having at least one series of channels the opening of which is defined by a ring containing 12 oxygen atoms, using at least one solution containing elements of the hydrodehydrogenating function and phosphorus;
   b) drying at a temperature of less than 180° C. without subsequent calcining;
   c) impregnating with an impregnation solution comprising at least one C1-C4 dialkyl succinate, acetic acid and at least one compound of phosphorus if it has not been introduced in its entirety in a);
   d) maturation;
   e) drying at a temperature of less than 180° C. without subsequent calcining.

11. A process according to claim 10, in which all of the hydrodehydrogenating function is introduced during a).

12. A process according to claim 10, in which the dialkyl succinate and the acetic acid are introduced into the impregnation solution of c) in a quantity corresponding to a molar ratio of dialkyl succinate to impregnated element(s) from group VIB of a catalytic precursor in the range 0.15 to 2.5 mole/mole, and to a molar ratio of acetic acid to impregnated element(s) from group VIB of the catalytic precursor in the range 0.1 to 10 mole/mole.

13. A process according to claim 10, said process comprising in succession:
   a) dry impregnation of said support using a solution containing all elements of the hydrodehydrogenating function and phosphorus;
   b) drying at a temperature in the range 75° C. to 130° C. without subsequent calcining;
   c) dry impregnation with an impregnation solution comprising dimethyl succinate and acetic acid;
   d) maturation at 17-50° C.;
   e) drying at a temperature in the range 80° C. to 160° C. without subsequent calcining.

14. A process according to claim 10, in which phosphorus introduced into the catalyst, expressed as the quantity of oxide, is a quantity in the range 0.1% to 20%, by weight.

15. A process according to claim 10, in which the product obtained at the end of e) undergoes sulphurization.

16. A process for the hydroconversion of hydrocarbon feeds in the presence of a catalyst according to claim 1.

17. A process according to claim 10, in which phosphorus introduced into the catalyst, expressed as the quantity of oxide, is a quantity in the range 0.1% to 15%, by weight.

18. A process according to claim 10, in which phosphorus introduced into the catalyst, expressed as the quantity of oxide, is a quantity in the range 0.1% to 10%, by weight.

* * * * *